AUTOMATIC MANUFACTURING APPARATUS
Original Filed Aug. 31, 1964 3 Sheets-Sheet 1
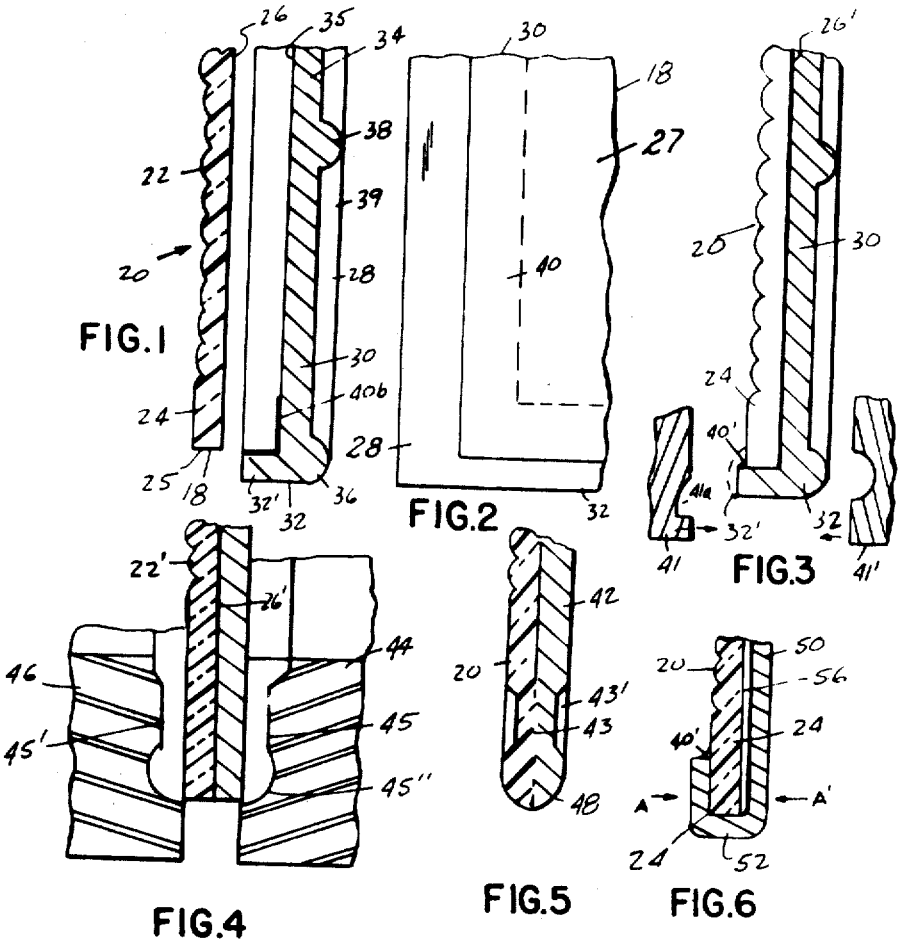

AUTOMATIC MANUFACTURING APPARATUS

Original Filed Aug. 31, 1964 3 Sheets-Sheet 2

AUTOMATIC MANUFACTURING APPARATUS

Original Filed Aug. 31, 1964 3 Sheets-Sheet 3

United States Patent Office

Re. 27,992
Reissued Apr. 30, 1974

27,992
AUTOMATIC MANUFACTURING APPARATUS

Jerome H. Lemelson, 85 Rector St.,
Metuchen, N.J. 08840

Original No. 3,594,254, dated July 20, 1971, Ser. No. 393,292, Aug. 31, 1964, which is a continuation-in-part of application Ser. No. 703,523, Dec. 18, 1957, which is a continuation-in-part of application Ser. No. 559,232, Jan. 16, 1956. Application for reissue Jan. 31, 1973, Ser. No. 328,488

Int. Cl. B44f *1/10*

U.S. Cl. 156—384 20 Claims

Matter enclosed in heavy brackets [ ] appears in the original patent but forms no part of this reissue specification; matter printed in italics indicates the additions made by reissue.

ABSTRACT OF THE DISCLOSURE

An apparatus for the automatic and continuous production of composite sheet material comprising first and second extruding means for extruding synthetic resinous material, automatic printing means, laminating means and means for deforming predetermined lengths of laminated material.

Figure 7:
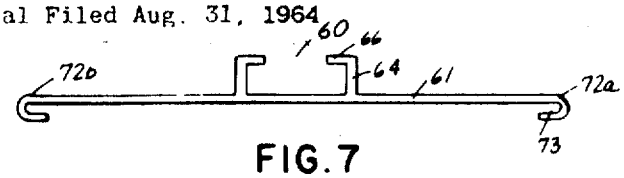
Figure 7:
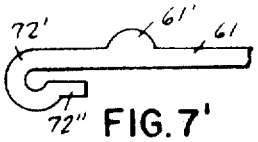

This invention relates to outdoor advertising displays and in particular to display sign construction and fabrication techniques and is a continuation-in-part of application Ser. No. 703,523 filed Dec. 18, 1957, which was a continuation-in-part of application Ser. No. 559,232 filed Jan. 16, 1956.

In the fabrication of displays and signs for use out of doors such as in highway safety and advertising signs which comprise assemblies of two or more sheet materials such as a plastic lens sheet and a base sheet of plastic or metal, numerous problems are presented. These problems result from such factors as weathering, erosion, discoloration, warpage and the like which may render the signs inefficient after a short period of use. Where a transparent plastic lens sheet is employed over a display sheet or base in the manufacture of a reflecting display, for example, it is imperative that the optical characteristics of the lens sheet and the display sheet be maintained. Otherwise the characteristics of the display will change or deteriorate. For example, if moisture should penetrate to the interface between the lens sheet and the reflector sheet or layer, refraction due to the water droplets or layer will reduce the effectiveness of the reflector and change its characteristics because of the refraction effects of the water. Water vapor may also cause the lens sheet to warp and thereby further disrupt reflection from the display sheet. Furthermore, dust and dirty water may penetrate the interface to cause absorption of part of the light and reduction of the reflection back through the lens sheet.

Accordingly, it is an important object of this invention to provide apparatus for the fabrication of lens type of outdoor displays and safety signs in which the optical characteristics of the sheets are faithfully maintained over extended periods of use.

It is another object to provide new and improved designs for outdoor signs which may be mass produced at low cost.

It is still another object to provide machinery for both laminating and forming articles of plastic and metal sheet on a continuous basis without the need for preshaping or conditioning the plastic.

It is yet another object to provide automatic machinery for fabricating articles of laminated plastic and sheet metal on a continuous basis wherein the plastic is provided as a continuous extrusion in a semi-molten state thereby permitting it to be easily fused onto the sheet metal and wherein the sheet metal is formed thereafter in a press with the plastic still in a non-hardened state such that the forming is simplified and a surface of the plastic may be further formed or conditioned by one of the dies in which the laminated sheet is formed.

A further object is to provide automatic machinery for the mass production on a continuous basis of highway signs without any interruption in the production process and without the need for any manual operation in the fabrication of the signs.

Another object is to provide means for producing shaped articles of plastic and metal on a continuous basis without the need for manually operating on the articles during fabrication.

Another object is to provide improved means for automatically producing articles made of plastic and metal sheet on a continuous basis wherein the plastic is extruded and applied directly to the metal sheet while the plastic is in a semi-molten state and is caused to adhere to the sheet by virtue of its adhesive characteristics while in such state.

Another object is to provide improved automatic apparatus for laminating two sheets of metal formed by extrusion immediately after their extrusion while they are at an elevated temperature due, at least in part, to the extrusion and are thereby in an improved condition for pressure welding with the bonding surfaces thereof being free of excessive oxidation.

Still another object is to provide new and improved apparatus for laminating members of metal and nonmetal layers, at least one of which is produced continuously by extrusion.

Another object is to provide new and improved display signs having a construction including a base board made of an extrusion or molding with integrally formed reinforcements provided therein thereby eliminating the need to post-form the base.

Still another object is to provide new and improved sign components including a base panel for supporting a display, the base panel being pre-shaped for receiving and holding the display and for facilitating the hermetic sealing of the display.

Another object is to provide new and improved constructions of plastic panels and displays.

Another object is to provide new and improved methods of producing articles of manufacture on a continuous basis, the articles having a layer or part thereof made of a thermoplastic material which is automatically formed while in a semi-molten state simultaneously with the formation of the rest of the article.

Another object is to provide apparatus for automatically and continuously producing articles of manufacture made of at least two layers of sheeting material laminated together without the necessity of handling either of the sheets in coil form or stacks by simultaneously forming both the sheets in extrusion apparatus from a raw, bulk material and immediately conveying the sheets thereafter to laminating and/or shaping apparatus.

Another object is to provide new and improved constructions of display signs and the like, the interfaces of which are hermetically sealed from moisture, and dirt.

Still another object is to provide improved means for joining sign frames and other similar articles employing pressure welding techniques, including novel means for joining and effecting a seal across three pressure weldable members.

Another object is to provide apparatus for automatically forming or embossing a surface of a laminated sheet of thermoplastic material.

For a better understanding of the invention, reference is made to the following description in conjunction with the accompanying drawings and its scope will be pointed out in the appended claims.

Referring now to the drawings, in FIGS. 1 to 3 there is shown a corner of an improved display or sign 18 prior to and after the assembly of the sign to illustrate the design details of the component parts and the method of assembly. FIG. 1, which is a cross sectional view of the corner fragment shown in FIG. 2, shows the sign or display panel, prior to its assembly, as comprising a base member or frame 28 having a base sheet section 30 with a circumscribing rim wall section 32 formed integral therewith. Base 28 is adapted to receive in the pan formed wall 32, a panel or lens sheet 20, which is shown as a sheet of transparent flexible vinyl or rigid plastic such as high impact polystyrene, having a surface formed with a multiplicity of cylindrical lenticular projections 22 extending parallel to an edge of the sheet 20. To provide a dynamic display of the changing or intermittent type, the pictorial illustration 27 thereon is preferably printed on the rear face 26 of the lens sheet 20 prior to the assembly of the sign. The picture or display 27 comprises one of several illustrative forms such as one which includes an arrangement of opaque lines having transparent areas interspersed therebetween or a dual picture in two parts, each of which is printed in a different color transparent ink, or at least one of which is colorless, each of the pictures or parts of the display being provided on band areas, each band of the latter being interspersed in a band area of the other picture or part of the display. Such dual illustration is provided so that the bands making up each picture are parallel to the rib-like lenticular formations 22 and are dimensioned so that only one picture is viewable at a time by an observer, depending upon his position relative to the sign.

A reflex-reflecting coating or sheeting 35 is provided on the inner face 34 of the sign, if the sign is to be used at night next to a roadway. Coating 35 may comprise a multiplicity of small glass spheres having a size such as .001 to .005 inch diameter and bonded against face 34 with an adhesive or a sheet such as the type marketed under the trade name Scotch Lite. The base 28 is shown as having a series of ribs 36, 38 and 39 running longitudinally and laterally across the sign for reinforcing base 28. Backboard 28 may be formed of plastic by compression or transfer molding or of a metal such as aluminum by extrusion, or by molding. FIG. 3 shows sheets 20 and 28 in an assembly in which the surface of coating 35 is in intimate contact with the rear face 26 of lens sheet 20.

Two methods of insuring the hermetic sealing of the interfacial area between base 28 and lens sheet 20 are provided to prevent moisture, water or dust from penetrating thereinto. In one method a coating of an adhesive and sealant 40, such as a balsam or alkyd resin lacquer adhesive which is compatible with sheet 20 and base 28, is provided in a circumscribing area around the inside surface of wall 32 and for a brief band-like area 40b around the face 34 of base 28. Sheet 20 is then brought against base 28 with its edge 25 and the rear face of the border section 24 abutting against adhesive coating 40 and with border section 24 clamped tight against base sheet section 30. The ribs 36, 38 and 39 are dimensioned and closely enough spaced to sufficiently stiffen the frame 28 such that surface 34 will remain flat and frame 28 will not warp after assembly due to heat and other weathering factors. When the band of coating 40 has dried, an effective hermetic seal is provided for the thin interfacial strip volume 26'.

A second method of effecting a hermetic seal between lens sheet 20 and frame 28 and of securing the two is shown in FIG. 3. It comprises deforming and fusing part of the wall 32 with a flat circumscribing border area 24 of sheet 20 by means of a heated die 41, a fragment of which is shown in cross section, which is brought against the protruding rim of wall 32 as frame 28 is held by a backplate 41'. Consequently, the thermoplastic material of wall 32 is caused to melt and flow inward into the enlarged cavity 41a of die 41 thereby forming the overhanging shelf 32' which upon solidification of the material, holds lens sheet 20 against frame 28. For hermetic sealing the area 26' between the sheets, the thermoplastic material of sheet 20 is preferably made molten by heat transferred through sheet 32' from die 41 and is welded to shelf 32'. Similarly, if the backplate 41' is made of a flat sheet of metal, the border strip 24 of lens sheet 20 may be heat sealed thereagainst by a circumscribing die or deformed over the edge of the metal sheet by means of a heat sealing die.

FIGS. 4 and 5 illustrate another means of assembling a multiple sheet panel sign of the type illustrated in FIGS. 1 to 3 in sealing engagement by means of welding the lens sheet and the base sheet, both of which are made of thermoplastic materials. The numerals 44 and 46 designate a pair of heat sealing dies, which are shown only in cross section disposed across the border of the sign. These dies have band-like sealing surfaces 45 and 45' which extend in a circumscribing or annular path around each die-block respectively and are utilized to provide a circumscribing seal in the form of a band-like weld or fusion of the materials of lens sheet 20 and base sheet 42 about the borders of the two sheets. So as not to interfere with the fusion of the two sheets, the interlayer or sheet 26' of display or reflecting material does not extend to the border area of the sheets 20 and 26' but occupies the central area of the interface of the two. Each of the dies are respectively shaped with recesses 45'' adjacent the outside end of the sealing ridges 45 and 45'' which are provided to permit material compressed and made molten between the ridge sections 45 and 45' to flow therein and to fuse into a unitary mass having the shape of the recesses and thereby give the borders of the assembled panel a bead-like formation 48 as illustrated in FIG. 5. Thus, the seal extends not only across the interface compressed between the die ridges 45 and 45' but also to the edge of the panel.

FIG. 5 shows in fragmentary cross section the assembly of display components of FIG. 4 after a circumscribing weld has been effected around the border thereof. The weld is effected at location 43 which comprises fused or bonded material of both the base sheet 42 and the lens sheet 24 fused together in a circumscribing band by means of heat and pressure. Indented channels 43' are formed in both the sheets 24 and 42 although they need not necessarily be as deep as illustrated. The numeral 48 refers to the border or marginal section of the joined sheets which completely circumscribes the new panel 18' and is formed in the channel cavities of the dies of FIG. 4. The border section 48 is preferably a unitary fused mass caused by the flow of the material of both sheets, the fusing together of both resulting from heat of the dies and the reduction in cross section at weld 43. Since the border volumes of sign 18' are completely sealed and reinforced by means of the bead formation of border section 48, the sign is both hermetically sealed and edge reinforced.

In FIG. 6, another lens sign construction is illustrated by means of a sectional view at an edge of a sign comprising an assembly of a base sheet 50 and a lens sheet 20 with a display sheet or layer 56 therebetween. The intermediate sheet 56 may comprise a sheet of reflex reflecting material such as Scotch Lite which is held in clamping engagement between sheets 50 and 20 by forming the border section 52 or sheet 50 in a half loop, as shown, so that the border section 24 of sheet 20 and intermediate sheet 56 may be engaged therein. By permanently deforming the half loop section 52 by means of clamps or a press having jaws or dies acting in the direction of the arrows A and A' to cause said looped section 52 and the base sheet 50 to be pressed more closely together, the sheets 20 and 56 may be compressively engaged together and against sheet 50. Unless the plastic of sheet 20 is flexible in a manner such as plasticized vinyl and the edge of the lip of 52 is deformed into section 24 in sealing engagement, it will be necessary to provide a circumscribing fillet or coating band 40' of sealant over the edge of section 52 and across the adjacent surface of section 24, as shown, to effect a hermetic seal thereacross. Fillet 40' preferably comprises an air drying, transparent plastic of the same composition as section 24. The base sheet 50 may be suitably of aluminum, steel or plastic. The sealant fillet 40' would necessarily extend over and across all areas of sections 52 and 24 as would be required to effect an hermetic seal and preferably for a distance or width great enough to maintain the seal without rupture under all natural warpage conditions to which the sign may be subjected.

FIGS. 7 to 11 show further details of display sign construction comprising an assembly of multiple panels or sheets of the type described. FIG. 7 is an end view of a sheet-like extrusion of plastic or aluminum which may be used as the base or support for a sign of the type described. The extrusion 60 comprises a board sheet section or panel plate 61, the lateral edges of which are extruded or post-formed to a shape, such as the loop or open bead 72 shown, bead 72 serving both as part of a frame for holding one or more sheet members against the base plate 61 and to reinforce the edge of the extrusion as well as stiffen the sign. The sheet member 20 and/or other sheets such as the reflex reflecting sheeting may be assembled with their lateral marginal areas positioned in the walled volumes 73 after which the strip loop sections 72a and 72b may be rolled or pressed to deform the end strip sections 72' and compressively engage the sheet(s) against plate 61.

The extrusion 60 is shown with a pair of longitudinal angle sections 64 and 68 having end formations 66 and 70, formed integral with and projecting from the back of plate 61. Sections 64 and 68 may be used to secure the sign to a post or upright preferably shaped in cross section to the inside shape of sections 64 and 68 so that it may be permitted to slide between the angle sections and be held by one or two set screws. It is seen that the extrusion of FIG. 7 greatly reduces the number of operations and components of a sign of the type described since assembly is effected by cutting the extrusion to the desired length, sliding the display (such as lens sheet 20) between the looped marginal sections 72a and 72b and crimping or bending the sections to compressively engage a display section against plate 61.

A circumscribing band-like coating 78 of suitable air drying plastic may thereafter be applied over the strips 72' and a brief band area of lens sheets 20 as shown and over the edges of the ends of the assembly to completely seal the interface between sheet 20 and plate 61 from moisture.

FIG. 7' is a partial view shown edgewise of an extrusion 60' similar to 60 of FIG. 7 which is provided with additional reinforcing means formed integral with the base sheet for stiffening the sign member. The reinforcing means comprises one or more sections or stiffeners 61' of increased thickness running longitudinally along plate 61 and preferably either formed on plate 61 by extrusion therewith, or if extrusion 60' is formed in a press, by compression molding the stiffener(s) thereon. The edge bead 72' of extrusion 60' is shown provided with a flat edge lip 72'' for engaging a lens sheet in clamping engagement therebetween. The protruding portions 72'a of edge bead 72' may serve as a stiffener or decorative rib adapted to simulate, for example, the frame of a picture mount or frame.

Figure 8:
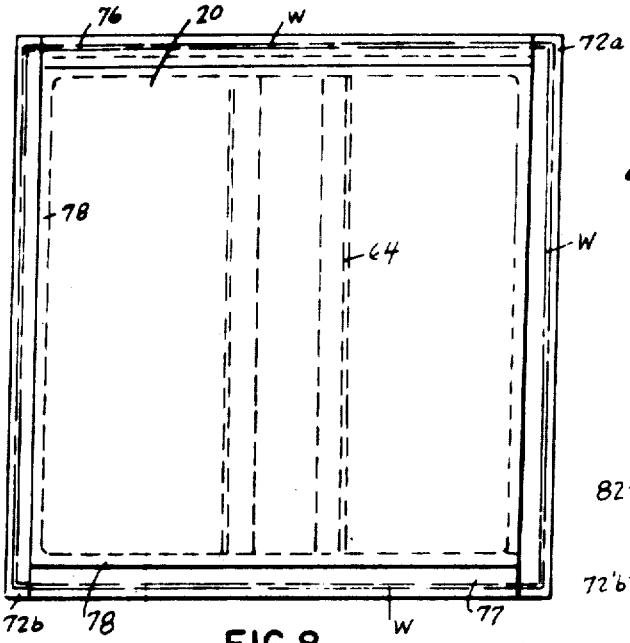

FIG. 8 shows a length of an extrusion such as 60 modified to hold a display slightly narrower and shorter than extrusion 60. The display or ribbed sheet 20 is positioned against the face of frame 61 with the looped or rolled edges 72a and 72b overhanging the lateral borders of sheet 20. Two stepped end strips 76 and 77 are then secured to frame 61 at each end of the extrusion 60 and extend between the ends of edges 72a and 72b as shown. The strips 76 and 77 may be welded, bonded, or held with fasteners against frame 61. The border sections 76, 77, 72a and 72b may then be coated with a sealant 78 such as a plastisol, organisol, or other resin by spraying or dipping in a manner such that a circumscribing hermetic seal is formed across the frame, the extrusion or base and sheet 20. The sealant 78 is shown extending over the sections 72a, 72b, 76 and 77 as well as partly over a border of the ribbed sheet 20 and extends completely around the frame. If strips 76 and 77 are welded in a continuous weld line W around the sign, then it will only be necessary to coat the corners of the sign 59 as illustrated in the lower left corner.

Figure 9:
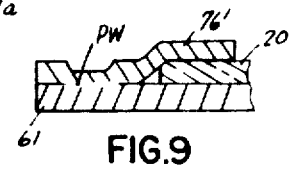
Figure 10:
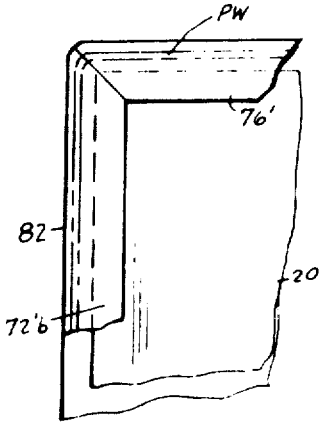

A further alternate method whereby a hermetic seal is effected across a framed display is shown in FIGS. 9 and 10. The border strip 76 is shown as having a raised section 76' which compressively engages sheet 20 against base sheet 61 when 76 is welded to frame 61. By cold pressure welding strip 76 to frame 61 in a line PW as shown in FIG. 8 as extending the length of strip 76 and crossing edges 72a and 72b as well as across the strip 77 and crossing the beaded edges 72a, 72b, at the other end of frame 61, an effective hermetic seal is provided.

Figure 11:
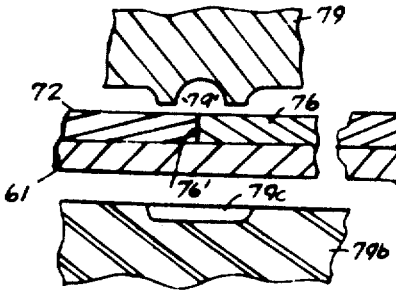
Figure 12:
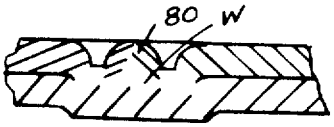

FIGS. 11 and 12 illustrate how the parting line 76'' between strips 76 and 72 is effectively sealed off by cold pressure welding. The pressure welding die 79 which abuts the two strips 72 and 76 and welds each to the base sheet 61 is provided with a cavity 79' which is positioned over the joint or separation 76' betwen strips 72 and 76 during welding. When the two strips 72 and 76 are compressed by die 79 against frame 61 which abuts a platen 79b, metal from both strips 72 and 76 is not only caused to flow and molecularly bond to frame 61, but some metal from strips 72 and 76 flows into cavity 79'. In cavity 79', it flows together and effects a weld as illustrated in FIG. 12 which effectively seals off the edge interfacial volume 76' as shown by the formation of bead 80 above the interface in die cavity 79'. The other die 79b is preferably provided with a cavity 79c to restrict the lateral flow of the metal of all three sheets so that bead 80 is formed.

Figures 13, 14, 15, 16:
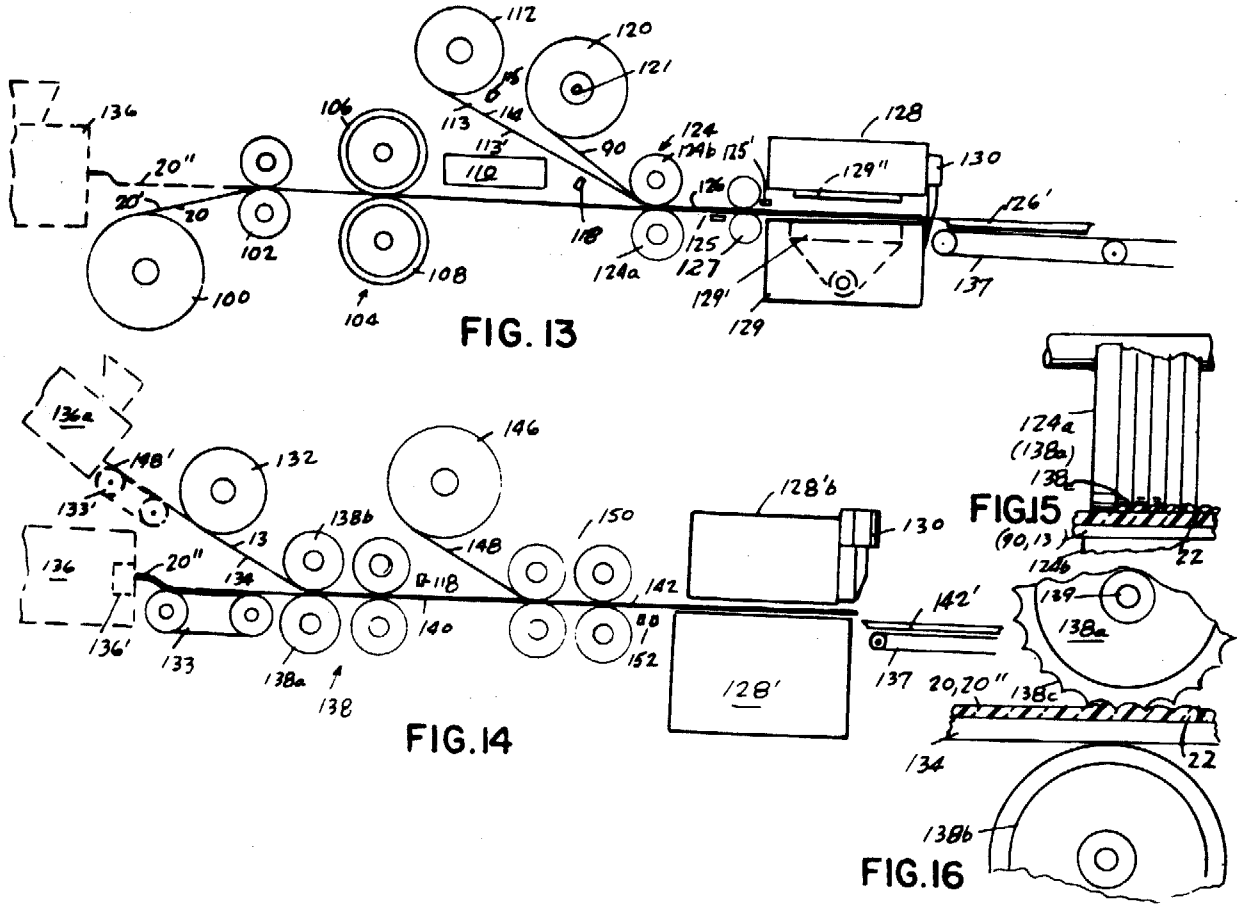

FIG. 13 depicts apparatus for automatically producing laminated signs of the type described. A supply of sheet plastic such as the ribbed plastic sheet 20 of FIG. 1 is provided on a roll 100 and is guided by guide rolls 102 through a rotary printing press 104 which comprises at least a pair of rolls 106 and 108. One of rolls 106 and 108 is a printing roll and the other a driver or depressor roll preferably containing a surface contour having indentations conforming to the shape of the lenticulations or ribs formed in the sheet 20 to prevent damage to said lenticulations and to serve as a means for driving sheet 20 and maintaining its registration relative to the printing roller. The two rollers 106 and 108 are preferably geared or otherwise synchronized to rotate together such that, if the ribs in sheet 20 ride in indentations in the depressor roll and there is no slippage between the sheet and the depressor roll, the illustration printed on sheet 20 by the printing rollers will always be in registration with lenticulations 22. It is to be noted that lenticulations 22 may run parallel or perpendicular to the longitudinal direction of sheet 20 depending upon whether they are formed by extrusion of the sheet or by rolling a ribbed wheel or die against a surface of the sheet while it is in a semi-molten condition. It is also to be noted that the supply roll 100 may be replaced by a plastic extrusion machine 136 having a die shaped to provide the plastic as a continuous sheet with the lens ribs running parallel to the edges of the sheet.

Conventional means may be utilized for powering the illustrated feed, laminating the guide rolls of FIG. 13 at constant and predetermined speeds and to maintain registration of the sheets.

From the printing press 104, the sheet 20 is driven past drying means 110 for the printing which comprises one or more radiant heaters and/or nozzles or ducts through which air is blown against the surface of sheet 20. Sheet 20 is next passed through apparatus for laminating it with a rigid base sheet 90, and/or a reflex reflecting sheeting 113 or coating applied between sheet 20 and base sheet 90. The laminating apparatus includes a supply coil 112 of a reflex reflecting sheet material 113 such as Scotch Lite, an applicator 115 for applying a thin coating of a transparent adhesive to the outer surface 114 of sheeting 113 and a second applicator 118 for applying a transparent adhesive coating to the reflex reflecting surface 113' of sheeting 113. The two applicators are each illustrated as one or more banks of spray nozzles terminating in a pressurized supply source of the adhesive (not shown) and positioned on a rigid mount facing the respective surfaces of sheeting 113. Such spray nozzles are adjusted and the means pressurizing the adhesive is regulated to provide a uniform coating of adhesive on the respective surfaces of sheeting 113 of the desired thickness. The spray applicators may be replaced by a pair of rollers through which sheet 113 is driven, each of which is provided with means for rolling a thin coating of adhesive on a respective surface of sheeting 113. It is also noted that the means for applying an adhesive to the surface of sheeting 113 containing the reflex reflector may be adapted to apply the adhesive only to predetermined strip areas extending inward from each border of sheeting 113 so that the adhesive, even though it may be in the range of the refractive index of the reflex reflecting beads on sheeting 113, does not lower the reflecting efficiency of the reflex reflecting surface. It is further noted that sheeting 113 may be eliminated by the provision of means for applying reflex reflecting glass beads to the rear surface 20' of sheet 20 or the facing surface of base sheet 90 to be laminated therewith.

Base sheet 90, which may be a rigid plastic or a metal such as aluminum or steel is supplied on a coil 120 mounted on a shaft 121 which is shown supported in bearing above sheet 20 in a position to feed sheet 90 in a motion parallel to that of sheet 20 and through one or more pairs of laminating rollers 124. Laminating rollers 124 compress the three sheets 20, 113 and 90 together in a sandwich assembly whereafter the sandwiched sheet 126 may be cut into desired lengths, coiled or further formed as shown.

If sheet 90 is of metal, and the feed of sheet 20 is intermittent and controlled by known means to start and stop after a predetermined length of sheet 20 of sheet 90 has passed a given point in its travel, a conventional stamping press may be employed to provide reinforcing ribs and/or edge reinforcements along a given length or display part of sandwiched sheet 126.

Illustrated in FIG. 13 are means for continuously forming sheet 126 without stopping the feed of the apparatus by utilizing a flying bed press 128 of a conventional design having forming dies adapted to engage and shape or cut the moving sheet 126 while it is in motion and to automatically return to a position where it may engage and form or cut the next length of sheet 126 automatically and without the need for attendance of an operator. It is assumed that the synchronizing and control means for actuating press 128 are part of the press. The numeral 130 refers to a shear at the end of press 128 adapted and synchronized to the action of the latter to cut-off predetermined lengths of the sheet which have been formed therein. The formed tray-like or beaded section 126' of the sign pass over a belt conveyor 137 so that when they are cut off they are carried to a destination for storage or stacking or are further processed or packaged.

It is to be noted that if the material comprising the lens sheet 20 is still in a condition whereby it may be permanently shaped by impression means when it enters press 128, either as a result of being heated by a heater element or bank of radiant heaters as shown at 110 or after emerging from drive rolls 127, the flying bed press 128 may be utilized not only to cut and/or form the laminated member 126 by permanent deformation of the base sheet 90 but may also be used to shape the semi-molten layer 20 thereof. In other words, the lenticulations or reinforcing or decorative beads or formations may be formed in plastic layer 20 of sheet 126 by shaping the die of the bed section 129 of the flying bed press 128 to provide the desired post-forming or essentially compression molding of sheet 20 on its base sheet 90. If sheet 20 is chosen to be a thermoplastic material such as impact styrene, acetate, glass, acrylic or the like which will crack or craze when it solidifies if subjected to bending or other types of stress, the provision of sheet 20, in a sufficiently soft or semi-molten condition when it enters flying bed press 128, either by virtue of its condition when it is extruded prior thereto or by auxiliary heating means, will greatly simplify the forming of laminated sheet 126 in the press 128 and will permit molding the plastic without difficulty by means of a die of the press. The temperature of the material of sheet 20 when it enters press 128 will be a function of the characteristics of the plastic, the extrusion rate or the speed at which lamination occurs and/or the heat radiated thereto from heating elements situated at the positions 110, 125 or 125'. The degree of its plasticity or fluidity when entering the press will depend in part on the characteristics of the stamping or forming operation effected by the press on the lamination, the latter in turn being a function of the flow and deforming characteristics of the plastic material and the manner of its reaction to the action of the press. If both base sheet 90 and lens sheet 20 are chosen to be of thermoplastic material, heaters will necessarily be provided above and below the sheet before it enters press 128 to render the lamination molten or soft enough to permit its pressing or forming in the press. It is to be noted that if base sheet 90 is chosen to be metal it may not only be deformed in the press to a desired shape for rigidity, such as a shallow pan shape, but it may simultaneously serve as a base upon which the thermoplastic layer may be shaped or molded by the action of the die facing the layer or coating 20. Press 128 thus concurrently serves both as an automatic forming means for laminated sheets and as a compression molding machine. The condition of sheet 20 must thus be such that it may be easily formed by flowing into the cavities of die 129' facing the sheet and will maintain such formed shape when die 129 is removed as the press returns and the sheet passes on.

Synchronization of the motion of press 128 may be controlled by precise timing means inherent in the control system of the machine or by means of a presettable predetermining counter riding on the rear surface of sheet 90 which provides a signal to cause the motors driving the press to reverse and retract from sheet 126. It is to be noted that for many applications, thermoplastic layer 20 would preferably be introduced on top of base sheet 90 wherein supply rolls 112 and 120 would be mounted below layer 20. The upper die 129'' of press 12 would then be used to shape plastic layer 20.

FIG. 14 shows apparatus for automatically producing laminated sheet members of a rigid sheet base 148 such as a metal, ceramic or plastic sheet and a thermoplastic sheet 20'' which is formed in an extruder and processed immediately thereafter in the apparatus, preferably taking advantage of the semi-molten condition of the extruded thermoplastic member. For the automatic production of signs of the type described, it is assumed that the base sheet 148 is provided in coil form on a roll 146 and that the surface 134 of sheet 131 is coated with glass beads of the light auto-collimating type described or laminated with a sheet of Scotch Lite on top of which is printed said dual picture display. As a result, lamination or bonding of the plastic sheet 20'' which is emerging at a constant speed from extruder 136, with base sheet 131 may be effected by utilizing the adhesive characteristics of the plastic by immediately feeding the plastic through laminating rolls 138 before the plastic has fully solidified. One of two techniques for forming the surface ribs or lenses in sheet 20'' may be employed. In one, the sheet 20'' may be extruded as a flat sheet and one or more of the lower rollers 138b of the laminator 138 (or the upper roller(s) 138a thereof) may contain lateral or longitudinal surface serrations (as shown in FIGS. 15 and 16) or cavities for molding or pressing the surface ribs in sheet 20'' as it is driven through, pressed against and bonded to the mating surface of sheet 131 or sheet 148. In the second method, the die of extruder 136 may be shaped to provide the ribs in sheet 20'' and whereafter the rollers of the laminator are shaped to both support the extruded ribs or irregularities and to compress the plastic sheet 20'' against the base sheet it is being laminated with.

From the laminating apparatus 138, the laminated sheet 140 or 142 may be rolled into a coil or loop, cut to predetermined lengths by an automatic operating shear or passed through a forming machine 128' which stamps or otherwise forms predetermined sections of the sheet with reinforcing indentations, ribs or edge walls, and/or punches holes in or cuts the sheet to length. Machine 128' may be a flying press or, if the base sheet 148 is a thermoplastic plastic, the apparatus 128' may comprise a vacuum forming or hot punching machine whereupon heating elements 152 would be provided between rollers 150 and machine 128' to make laminated sheet 142 soft enough to form. In FIG. 14, the numeral 133 refers to a belt conveyor positioned near the die of the extruder for receiving and feeding the extruded sheet 20'' to the laminatiing rolls 138. It is assumed that press 128' contains shearing dies for cutting of the prior formed length of the sheet 142 which drops onto a conveyor 137 on which it travels to a further packing or assembly area and cools or solidifies if necessary. The notation 152 may also refer to one or more banks of air hoses which are mounted adjacent to sheet 142 to blow cool air thereon and effect setting of sheet 142 if machine 128' is a conventional punch press. It is to be noted that the belt conveyors 133 and 137 have belt or conveying sections suitably consisting of a fluorocarbon resin or fluorocarbon resin coated fabric to prevent adherence of the conveyed product thereto.

In FIG. 14, the numeral 132 refers to a sheet of material having illustrations thereon to be bonded between the plastic lens sheet 20'' and the backing sheet or base 148. The sheet 131 may be a thin foil of a transparent acetate or polyester plastic containing a desired printed illustration, a thin sheet of aluminum or other foil which is printed, or a sheet of reflex reflecting material such as Scotch Lite. The need for a rotary printing press as provided in FIG. 13 is thus eliminated and the illustration provided on sheet 132 may be in a number of colors without the need for complex alignment control at the machinery illustrated or the lengthening of the line to permit ink to dry. The laminating rolls 138 are utilized to effect the bonding of printed sheet 132 to plastic lens sheet 20' which may also be used to laminate base sheet 148 therewith if 132 is not the width of plastic sheet 20''. An adhesive spreading or spraying device 118 is provided between the laminating apparatus 138 and the location where base sheet 148 meets sheet 140 if the characteristics of illustration bearing sheet 131 are such that it is necessary for completing the lamination beyond the rolls 138 in the laminating rolls 150. The bottom rolls or rolls 138 and 150 may be shaped and aligned to either post-form the surface of the plastic section 20' or to support such surface if sheet 20'' is shaped with irregularities or lenticulations as it emerges from the die of extruder 136.

Also illustrated in FIG. 14 in broken line form is a second extrusion press 136a positioned adjacent to the extruder 136 which may be used to provide a sheet 148' of thermoplastic material for lamination with extruded sheet 20' by the means illustrated. The extruder 136a thus replaces the supply of the base sheet 148 and may be positioned as illustrated (adjacent 136) for lamination with extruded sheet 20'' immediately after the two sheets are formed by utilizing the semi-molten condition of either or both of these sheets to adhere the two together, or extruder 136a may be located in the position of the supply roll 146 thereby permitting an intermediate sheet 131 to be laminated between the thermoplastic sheets 20'' and 148'.

FIGS. 15 and 16 show details of two possible forming and/or laminating arrangements for the fabrication of panels of the type described. In FIG. 15, a roller die or laminator drum 138a is shown adapted to be power rotated on a shaft 139 in close proximity to a second roller 138b which is also power operated and is adapted to engage the outer surface of the backing sheet or panel 130. The roller 138a is provided with a plurality of circumscribing 138c in its peripheral surface which are formed essentially normal to the axis of rotation of the drum. Peripheral indentations 138c may serve either of two functions. If the thermoplastic layer 20'' is either calendered on the surface of the base sheet 131 just prior to passage through rollers 138a and 138b or is provided in a flat, semi-molten state as a flat sheet, the formations in the surface of drum 138a may be used to shape the surface of sheet 20'' with a plurality of longitudinally extending ribs or lenses 22 as shown. If ribs 22 are already formed in layer 20'' in the extrusion thereof, then the formations 138c in drum 138a serve to effect the maintenance of the shape while forcing the sheet into laminating engagement with base sheet 131.

In FIG. 16, a drum 138a' is shown provided with rib-like formations or indentations 138c' extending parallel to the axis of rotation of the drum along its peripheral surface. Drum 138a' may function in either of the two manners described for the drum of FIG. 15. However, if thermoplastic sheet 20' is extruded or calendered onto base sheet 131, drum 138a' will act as a forming device for providing the ribbed formations in plastic sheet 20' by forcing or compressing it, while semi-molten and formable, against base sheet 131 in an action which is essentially a combination molding and laminating operation wherein the die or shaping drum 138a' coacts with the base sheet 131 to mold the semi-fluid plastic material to shape by causing it to flow into the cavities 138c' in peripheral surface of 138a' and simultaneously forces it in adhesive engagement with the coating surface of sheet 131. It is to be noted that the laminating action and adherence of plastic sheet 20' to base sheet 131 may be enhanced for certain thermoplastic materials by providing base sheet 131 at an elevated temperature when it reaches laminating rolls 138a' and 138b' by means of radiant heaters positioned off base sheet 131 and/or by spraying or spreading an adhesive on the surface of sheet 131 which contacts sheet 20. In the production of lenticular signs, a printed sheet or a reflex reflecting sheet with printing thereon would be laminated or adhered to the surface 134 of base sheet 131 which is laminated with sheet 20' prior to its entry into the laminator as illustrated.

It is noted that the automatic laminating apparatus of FIGS. 13 and 14 may be employed at least in part in the fabriaction of panels made of sheets one or more of which are made of extruded material other than thermoplastic resins. For example, either or both of the sheets 131 and 20' of FIG. 14 may be made of materials such as powdered metal, ceramics, glass, cellular thermoplastic or other extrudable material extruded to shape in either or both the extrusion machines 136 and 136a. It may be desired, for example, to form a sandwich array of two or more sheets of metal by extruding either or both the sheets from powdered or billet form continuously and feeding them immediately after extrusion through the laminating means 138 and/or 150 illustrated. If both of the sheets are capable of being bonded or welded by pressure welding at elevated temperature or by so called cold pressure welding, the lamintors would be arrays of rolling dies or a rolling mill. An advantage of this technique would be that the metal expressing or extruding from either or both the extruders 136 and 136a would be brought into surface contact with the other sheet and compressively welded or surfaces bonded together before either or both would have an opportunity for their surfaces to oxidize to an extent which would prevent pressure welding. The use of one extruder and a coil of the other sheet of metal 146 may also be employed if the coiled sheet 131 is in a condition for pressure welding, i.e. its surface does not have a heavy oxidized layer which would interfere with the lamination. A further advantage of laminating by providing at least one of the sheets as an extrusion of metal and immediately laminating or surface bonding after extrusion is derived as a result of the extruded member being at relatively high temperature which will enhance or be necessary for hot rolling the two sheets together. A radiant or induction heating means may be provided at location 110 of FIG. 13 or just off the extruded sheet or sheets of FIG. 14 to maintain the extrusion temperature or to raise said temperature even higher if necessary for hot rolling in the rolling mill sections 138, 150 although the efficiency of such a system is enhanced by the temperature of the extruded metal. The heating means positioned prior to the rolling mill may be a furnace for sintering or otherwise heating the metal extruding from press 136 and/or 136a. If necessary, the entire exposed length of the sheet or sheets during hot rolling may be kept under an atmosphere of an inert gas to prevent oxidation until they are welded together. An enclosure surrounding the apparatus may be provided depending upon the characteristics of the metal and the desired degree of freedom from oxygen. If the metals are copper or titanium and either or both are heated prior to entering the rolling mill such an enclosed atmosphere of inert or oxygen free gas would be a requisite.

It is further proposed that one of the extruders of FIG. 14 extrude a metal and the other a plastic or ceramic material or glass at the same rate for the automatic coating of the extruded metal sheet with the plastic or ceramic. In this manner, a fully automatic process for producing solid panels of metal and non-metals is attained without the necessity of handling coils of metal or plastic, or cut lengths of glass or ceramic. The forming and/or printing means provided in FIGS. 13 and 14 may be provided or may not be part of the process, as may the other illustrated and described heating, spraying (cooling, heating, cleaning, adhesive, etc.) nozzles. A further advantage resulting from the utilizing of the apparatus of FIGS. 13 and 14 for producing articles of extruded metal is that the metal when it emerges from the laminating means is in a formable condition by virtue of its elevated temperature, and may easily be formed, bent, etc. in flying press 128.

It is to be further noted that one or more of the materials 20', 148' or 148 of FIG. 14 may have a shape other than that of a sheet and may comprise any of the materials (metal, thermoplastic resin, ceramic, glass or other material such as filled resins). For example, either or both of extruders 136 and 136a of FIG. 14 may extrude shapes such as I-beams, angles, T's, Z's channels, molding or the like to be pressure welded or adhesively bonded to the other member which may be supplied on a coil or as an extrusion and may have a flat strip or irregular shape. Both of the members are guided as shown with at least a surface of each provided in contact with a corresponding surface of the other and adhesively or cohesively bonded to the other by means of cement or welding techniques. The rolls 150, in a further embodiment, may be forming rolls or dies for continuously forming the resulting laminated sheets into a predetermined shape or for trimming or surface forming the plastic section thereof. The rolls 150 may thus represent any rolling mill or forming dies of any conventional design such as tube forming dies and the many advantages of utilizing an extruded section may thus be derived for the continuous operation of the two materials.

The apparatus illustrated in FIGS. 13 to 16 is applicable for the production of various articles having a plastic overlay or lens cover member as described, such as packaging, novelties, displays and the like. For example, the support or backing sheets 90, 113, 130 or 148 may comprise cardboard or paperboard which is extrusion coated or embossed with transparent plastic defining a lens sheet. The laminated sheet assembly may be automatically formed into a box, container, tray, display cup or the like by the means provided in FIGS. 13 and 14 or modifications thereof such as means adapted to automatically cut, fold and fasten packaging containers thereof or to cut and automatically apply sections of said laminated sheet to containers or other articles. In other words, the apparatus illustrated, or modifications thereof may be used per se or aligned with and adapted to feed further container or article forming apparatus to continuously and automatically produce three dimensional display decorated containers, packages, displays and the like.

It is also noted that apparatus of the type provided in FIGS. 13 and 14 may be utilized as shown or modified to produce two-piece thermoformed containers, folding or set-up cartons of plastic coated paperboard on a continuous basis of sheet material produced as described on a continuous basis from freshly extruded plastic and/or metal formed continuously by extrusion or rolling and/or paper board supplied from a roll or freshly formed by conventional means and fed to the bite of the laminating means illustrated. Further pressing, rolling, corrugating, welding, creasing or laminating the laminated sheet assembly may be automatically performed after the first laminating operation.

I claim:

1. An apparatus for the automatic and continuous production of composite sheet material comprising:

(a) means for extruding a sheet of synthetic resinous thermoplastic material including die means for forming said material into an elongated web said means being connected to, (b) means for continuously extruding a second synthetic resinous material having the configuration of a sheet, (c) automatic printing means operative for printing a plurality of repeating designs on one of said extruded sheets to provide images on tandem areas of said one sheet, (d) means for continuously guiding and conveying said web and said sheet longitudinally with respect to each other and into abutting relationship, (e) means for laminating said web and said sheet to form an integrally laminated assembly in a bond resulting from the semi-molten condition of at least one of said extruded sheets, and (f) means for deforming predetermined lengths of both layers of said laminate into shapes of irregular contour.

2. Apparatus in accordance with claim 1 including means for extruding said second material as a sheet of cellular thermoplastic material of substantially constant thickness and at substantially the speed at which said first sheet is extruded, the means for laminating said sheets being operative to bond the two sheets as a result of the adhesive condition of said sheets as extruded.

3. An apparatus in accordance with claim 1, including means for continuously extruding said second sheet of a cellular plastic material.

4. An apparatus in accordance with claim 1, said deforming means comprising means for thermally deforming said laminate into said shapes of irregular contour.

5. An apparatus in accordance with claim 4, whereby said deforming means includes said laminating means.

6. An apparatus in accordance with claim 1, whereby said deforming means includes a press located downstream of said laminating means.

7. An apparatus in accordance with claim 6, whereby said press comprises a flying bed press operative to move said laminate during the deforming operation.

8. Apparatus in accordance with claim 1, whereby said deforming means includes said laminating means.

9. Apparatus for producing laminated structures of a plurality of synthetic resinous materials comprising in combination with a first extrusion means for extruding a first shape in the form of a sheet of a first synthetic resinous thermoplastic material as a continuous web and a second extrusion means for extruding a second shape of a second synthetic resinous thermoplastic material, said second synthetic resinous thermoplastic material having characteristics different than the characteristics of the material of said first shape, means for conveying and guiding said two shapes into surface abutment with each other including a laminating means, said laminating means being positioned and operative to compress said predetermined sections of said two abutted shapes while at least one of said shapes is in a thermally pressure weldable condition, and means for pressure bonding said shapes to each other as a result of said one sheet being in said weldable condition to provide a unitary deformed composite shape of the two materials.

10. Apparatus in accordance with claim 9 including die forming means located downstream of said laminating means for engaging and forming predetermined lengths of said composite sheet and die cutting means operative to sever the portions of said die formed sheet from the remainder of the laminated sheet.

11. Apparatus for producing synthetic resinous sheet materials comprising in combination with a first extrusion means for extruding a first sheet of a first synthetic resinous thermoplastic material as a continuous web, a second extrusion menas for extruding a second sheet of a second synthetic resinous thermoplastic material as a continuous web, means for conveying and guiding said two sheets into surface abutment with each other including a laminating means, said laminating means being operative to compressively engage said two sheets while at least one of said sheets is in a weldable condition, and means for pressure welding said sheets to provide a unitary web of the two materials.

12. Apparatus in accordance with claim 11 including a thermoforming means positioned beyond said laminating means and adapted to receive and thermally deform the laminated sheet formation with a plurality of indented formations each provided along respective predetermined lengths of said laminated sheets.

13. Apparatus for the continuous production of artcles made of composite laminated material comprising:

first extrusion means for extruding a first synthetic resinous plastic material as a continuous web, means for feeding said web from said first extrusion means, second extrusion means for continuously providing a second synthetic resinous material as a second shape of constant cross-section, means for guiding said first and second materials into abutment with each other, laminating means for bonding the two plastic materials together as they are fed to form a composite laminated material thereof, pressure forming means located downstream of said laminating means for receiving said composite laminated material and operating on predetermined lengths thereof to permanently deform said laminated material, and automatic cutting means for severing lengths of said laminated material from the material fed from said laminating means.

14. An apparatus in accordance with claim 13, said pressure forming means comprising means for thermally deforming said composite laminated material.

15. An apparatus in accordance with claim 13, including a flying press operative to deform said predetermined lengths of said laminated material prior to severing the deformed portions thereof from the main sheet of composite laminated material.

*16. An apparatus for producing composite display sheet material comprising:*

*means for supplying a sheet of clear, synthetic resinous material having a plurality of elongated lenticular formations formed in one surface thereof and having an opposite surface thereof which is flat and is in a condition whereby printing may be applied thereto,*

*a printing means comprising a plurality of rolls including at least one printing roll and a depressor roll cooperating with said printing roll for compressing sheet material against said printing roll as it is fed,*

*said printing roll being operable to print a plurality of parallel and separated image bands on said flat surface of said sheet including a first array of space bands which are repetitive in arrangement and are substantially equispaced to define a first image field, and which bands are interposed between a second array of printed bands which are substantially equispaced from each other and have dissimilar image characteristics than the image characteristics of said first bands for defining a second image field,*

*means for guiding said sheet to said printing means and operating said printing means to print parallel image bands on said flat surface of said sheet in a manner such that said parallel image bands extend substantially parallel to said elongated lenticular formations provided in the other surface of said sheet so as to produce a lenticular display containing a visible illustration which appears to change to an observer as his line of sight changes relative to the composite display sheet material,*

*further means located beyond said printing means for applying and adhering a further material against that surface of said sheet containing said image bands printed thereon by said printing means so as to cover and protect same, and*

*means for feeding and taking up the sheet material after said further material has been bonded to the flat surface of said sheet of clear synthetic resinous material.*

*17. An apparatus in accordance with claim 16 wherein said means for supplying said sheet of synthetic resinous material comprises an extruder for extruding said sheet with said plurality of elongated lenticular formations formed in its surface.*

*18. An apparatus in accordance with claim 16 wherein said means for supplying said sheet of clear, synthetic resinous material comprises a roll supply of plastic sheet having said lenticular formations formed in a major surface thereof and means for guiding said sheet from said roll supply.*

*19. An apparatus in accordance with claim 16 including means for supplying said further material as a second sheet and means for guiding said second sheet into engagement with said flat surface of said clear, synthetic resinous material after applying said image bands to said flat surface, and means for laminating said second sheet to said sheet of clear, resinous material.*

*20. An apparatus in accordance with claim 16 including means located beyond said printing means for rapidly effecting the drying of the printed matter applied to said flat surface of said clear, synthetic resinous material prior*

*to the application of said further material thereto by said further means.*

References Cited

The following references, cited by the Examiner, are of record in the patented file of this patent or the original patent.

UNITED STATES PATENTS

| | | | |
|---|---|---|---|
| 3,264,164 | 8/1966 | Jerothe, et al. | 156—384 |
| 3,241,429 | 3/1966 | Rice et al. | 156—244 |
| 1,930,287 | 10/1933 | Short et al. | 29—140.5 X |
| 2,341,732 | 2/1944 | Marvin | 75—214 X |
| 3,385,721 | 5/1968 | Leach | 117—10 |
| 2,094,428 | 9/1937 | Fulton | 156—247 X |
| 2,218,809 | 10/1940 | Calkins et al. | 29—33 |
| 2,815,308 | 12/1957 | Robinson et al. | 156—244 X |
| 2,817,618 | 12/1957 | Hahn | 156—209 |
| 3,077,428 | 2/1963 | Heuser et al. | 156—244 X |

| | | | |
|---|---|---|---|
| 2,133,441 | 10/1938 | Fischer | 156—501 |
| 2,219,158 | 10/1940 | Van Benschoten | 264—1 X |
| 2,632,921 | 3/1953 | Kreidl | 117—38 |
| 2,917,217 | 12/1959 | Sisson | 138—103 |
| 3,024,147 | 3/1962 | Brooks et al. | 156—244 X |
| 3,079,636 | 3/1963 | Aykanian | 18—14 |
| 3,172,571 | 3/1965 | Marchak | 222—107 |
| 3,234,066 | 2/1966 | Mulholland | 156—244 |
| 3,241,429 | 3/1966 | Rice et al. | 350—167 |
| 3,250,173 | 5/1966 | Henry | 350—131 |
| 3,398,035 | 8/1968 | Cleereman et al. | 156 586 X |
| 2,817,618 | 12/1957 | Hahn | 156—277 |

DOUGLAS J. DRUMMOND, Primary Examiner

C. WESTON, Assistant Examiner

U.S. Cl. X.R.

156—387, 500, 581, 582.